United States Patent
Hong et al.

(10) Patent No.: US 7,434,133 B2
(45) Date of Patent: Oct. 7, 2008

(54) METHOD OF RETRANSMITTING DATA FRAME AND NETWORK APPARATUS USING THE METHOD

(75) Inventors: Jin-woo Hong, Seoul (KR); Dae-gyu Bae, Suwon-si (KR); Hyun-ah Sung, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 520 days.

(21) Appl. No.: 11/007,156

(22) Filed: Dec. 9, 2004

(65) Prior Publication Data

US 2005/0204250 A1    Sep. 15, 2005

(30) Foreign Application Priority Data

Jan. 30, 2004    (KR) ............ 10-2004-0006216

(51) Int. Cl.
*H04L 1/16* (2006.01)
(52) U.S. Cl. ............................... 714/748
(58) Field of Classification Search ......... 714/748, 714/749
See application file for complete search history.

(56) References Cited

U.S. PATENT DOCUMENTS

| | | | | |
|---|---|---|---|---|
| 4,356,484 A * | 10/1982 | Eckhardt | ............... | 340/7.23 |
| 4,590,468 A * | 5/1986 | Stieglitz | ............... | 370/450 |
| 4,970,714 A * | 11/1990 | Chen et al. | ............... | 370/216 |
| 5,260,933 A * | 11/1993 | Rouse | ............... | 370/216 |
| 5,528,605 A * | 6/1996 | Ywoskus et al. | ............... | 714/749 |
| 5,684,791 A * | 11/1997 | Raychaudhuri et al. | .. | 370/310.2 |
| 5,748,100 A * | 5/1998 | Gutman et al. | ............... | 340/7.22 |
| 5,748,362 A * | 5/1998 | Delacourt et al. | ............... | 359/332 |
| 5,784,362 A | 7/1998 | Turina | | |
| 6,038,606 A * | 3/2000 | Brooks et al. | ............... | 709/235 |
| 6,212,240 B1 * | 4/2001 | Scheibel et al. | ............... | 375/261 |
| 6,601,207 B1 * | 7/2003 | Vanttinen | ............... | 714/748 |
| 6,674,738 B1 * | 1/2004 | Yildiz et al. | ............... | 370/338 |
| 6,697,331 B1 * | 2/2004 | Riihinen et al. | ............... | 370/236 |
| 6,711,180 B1 * | 3/2004 | Delesalle et al. | ............... | 370/474 |
| 6,772,215 B1 * | 8/2004 | Rathonyi et al. | ............... | 709/230 |
| 6,898,414 B2 * | 5/2005 | Ekl et al. | ............... | 455/3.05 |
| 6,947,446 B2 * | 9/2005 | LoGalbo et al. | ............... | 370/468 |
| 6,980,541 B2 * | 12/2005 | Shvodian | ............... | 370/346 |
| 7,009,960 B2 * | 3/2006 | Ho | ............... | 370/347 |
| 7,088,702 B2 * | 8/2006 | Shvodian | ............... | 370/348 |
| 7,120,126 B2 * | 10/2006 | Odman et al. | ............... | 370/252 |
| 7,123,617 B1 * | 10/2006 | Abrol | ............... | 370/394 |
| 7,126,928 B2 * | 10/2006 | Tiedemann et al. | ............... | 370/329 |
| 7,127,254 B2 * | 10/2006 | Shvodian et al. | ............... | 455/450 |
| 7,184,767 B2 * | 2/2007 | Gandolfo | ............... | 455/435.2 |

* cited by examiner

*Primary Examiner*—Stephen M. Baker
(74) *Attorney, Agent, or Firm*—Sughrue Mion, PLLC

(57) ABSTRACT

A method of retransmitting a data frame and a network apparatus using the method are provided. In the method performed in a wireless network, a first network apparatus transmits a data frame requesting a response frame. A second network apparatus determines a type of response frame according to a reception mode of the data frame. The second network apparatus transmits the determined type of response frame to the first network apparatus. The first network apparatus retransmits the data frame according to the type of the response frame transmitted to the first network apparatus.

14 Claims, 8 Drawing Sheets

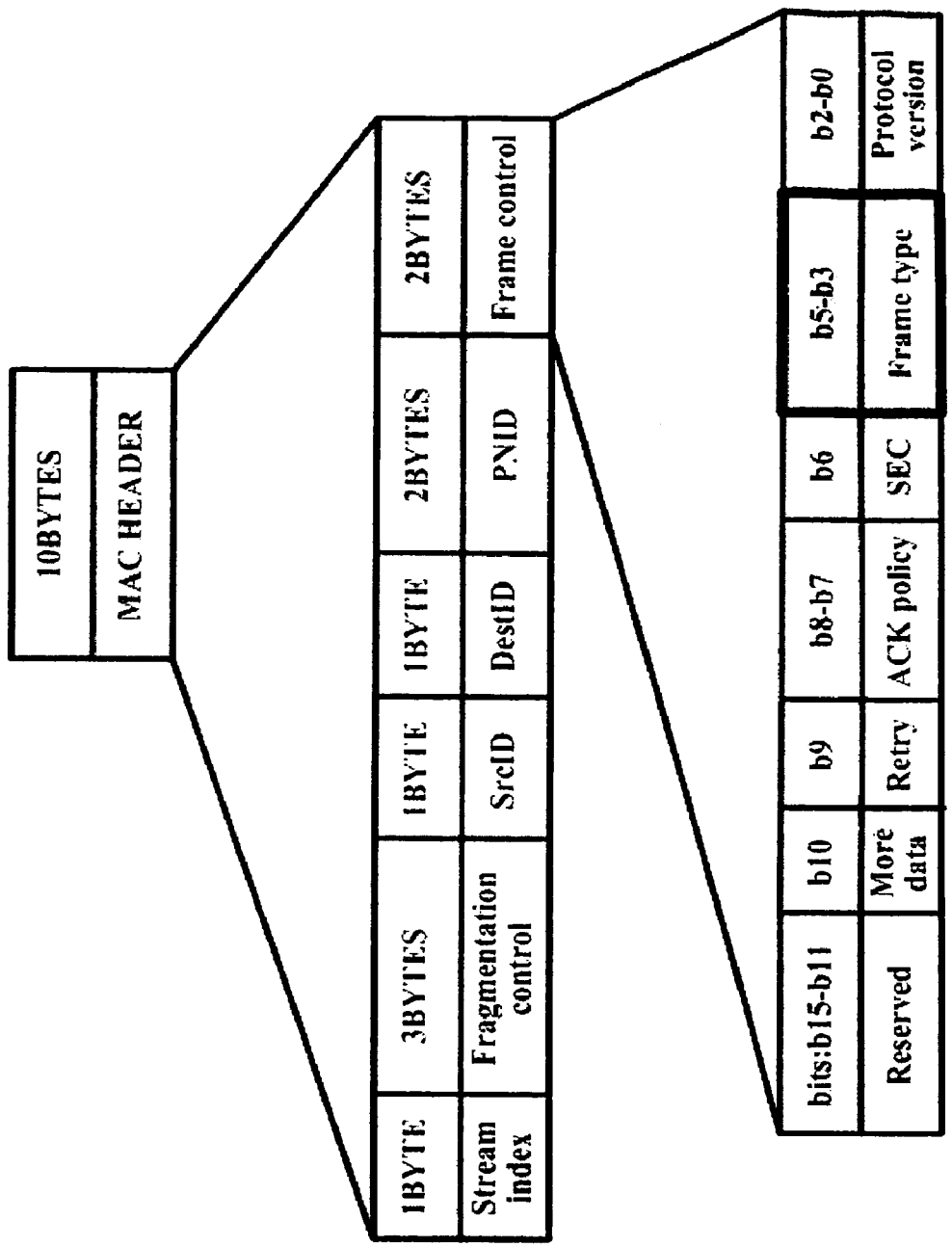

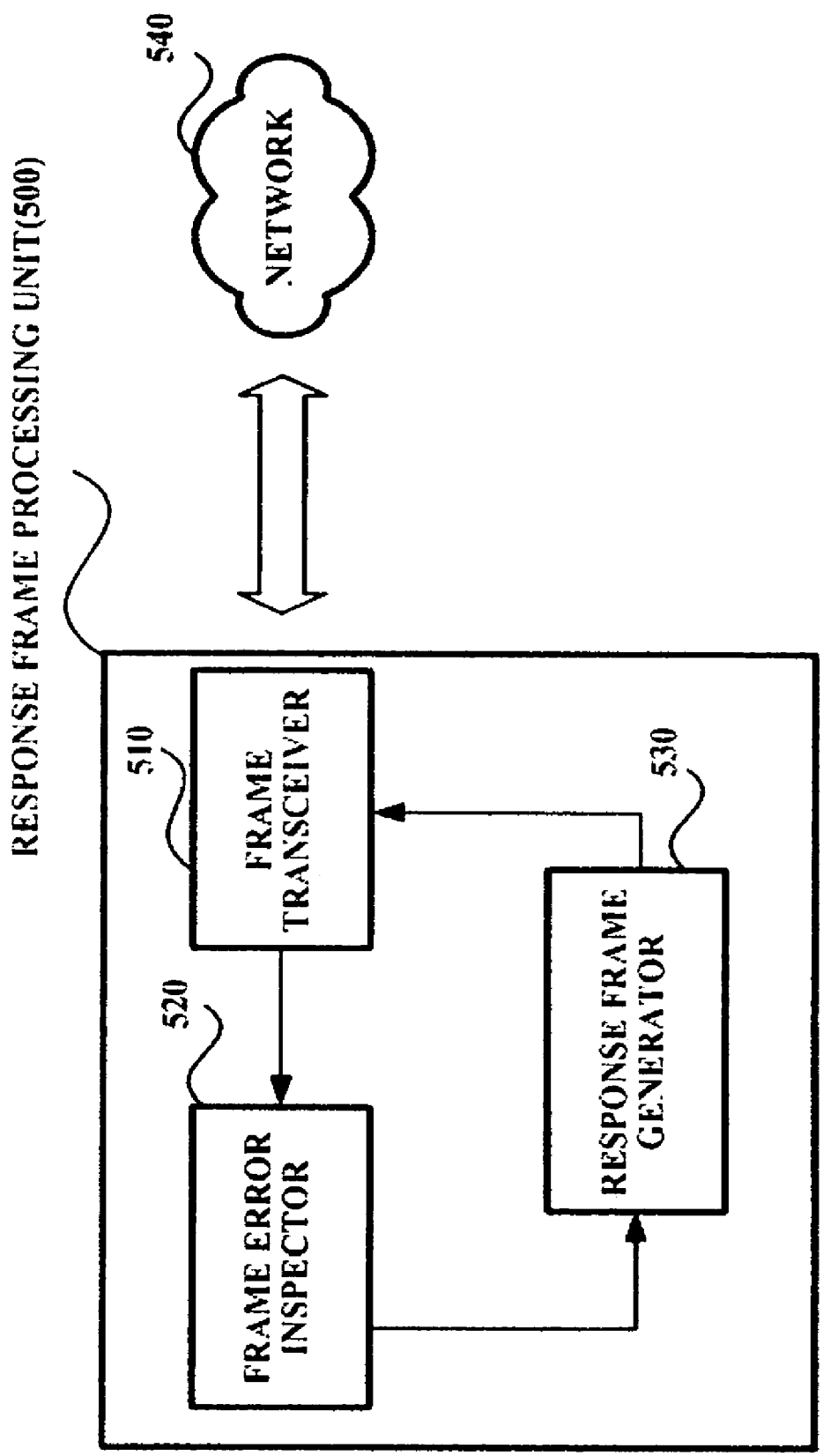

METHOD OF RETRANSMITTING DATA FRAME AND NETWORK APPARATUS USING THE METHOD

CROSS-REFERENCE TO RELATED APPLICATION

This application claims the priority of Korean Patent Application No. 10-2004-0006216 filed on Jan. 30, 2004 in the Korean Intellectual Property Office, the disclosure of which is incorporated herein in its entirety by reference.

BACKGROUND OF THE INVENTION

1. Field of the Invention

The present invention relates to retransmission of a data frame, and more particularly, to a method of retransmitting a data frame, by which a determination of whether to retransmit a data frame is made according to a response frame defined according to reception or non-reception of the data frame, and a network apparatus using the method.

2. Description of the Related Art

To effectively use the functions of a network, data communication over a wired or wireless network is performed using standard communication rules in which two devices wanting to communicate with each other agree upon what is communicated, how, and when. The standard communication rules are referred to as communication protocols.

Such communication protocols fundamentally conform to an Open System Interconnection (OSI) 7-layer model and are appropriately configured according to network characteristics such as whether a network is a wired network or a wireless network, a medium used for data transmission, etc.

In particular, most communication protocols define a method of transmitting a response frame reporting to a transmitter that a receiver has received a data frame correctly when the data frame forwarded by the transmitter reaches the receiver. Generally, such a response frame is referred to as an "ACK-response frame." For example, when a transmitter receives the ACK-response frame reporting correct reception of a first frame from a receiver after transmitting the first frame to the receiver, transmitter transmits a second frame to the receiver. However, in some cases, the transmitter may need to retransmit the first frame to the receiver. FIGS. 1A through 1C illustrate such a case.

FIG. 1A illustrates a case where a transmitter retransmits a data frame to a receiver according to conventional technology when an ACK-response frame transmitted from the receiver is lost.

When a data frame transmitted from a transmitter correctly reaches a receiver, the receiver transmits an ACK-response frame to the transmitter. However, when the transmitter does not receive the ACK-response frame within a predetermined period of time, i.e., a timeout, since the transmission of the data frame, the transmitter retransmits the data frame.

FIG. 1B illustrates a case where a transmitter retransmits a data frame to a receiver according to the conventional technology when the data frame transmitted from the transmitter is lost.

When a receiver does not receive a data frame transmitted from a transmitter, the transmitter retransmits the data frame after a predetermined period of time, i.e., a timeout, since the transmission of the data frame.

FIG. 1C illustrates a case where a transmitter retransmits a data frame to a receiver according to the conventional technology when a checksum error occurs with respect to the data frame transmitted from the transmitter.

When a data frame transmitted from a transmitter and then received by a receiver has an error, the receiver cannot transmit an ACK-response frame to the transmitter. Accordingly, the transmitter retransmits the data frame after a predetermined period of time, i.e., a timeout, since the transmission of the data frame.

Checksums include a checksum for a frame header and a checksum for a frame payload. A checksum error for the frame header is checked in a protocol layer lower than the current layer, and a checksum error for the frame payload is checked in the current layer of the protocol. For example, as for a Medium Access Control (MAC) frame conforming to an IEEE 802.15.3 protocol, a Header Check Sequence (HCS) (that is information used to determine whether a header has an error) is checked in the physical layer, and a Frame Check Sequence (FCS) (that is information used to determine whether a frame payload has an error) is checked in the MAC layer. When a checksum error occurs, a receiver may transmit a NACK-response frame to a transmitter to request the transmitter to immediately retransmit a data frame. However, when a protocol that does not define the NACK-response frame is used, the transmitter is put in a standby mode for a predetermined period of time.

A receiver may transmit an ACK-response frame every time a data frame is received from a transmitter. Alternatively, after the transmitter sequentially transmits a plurality of data frames to the receiver, the receiver may inform the transmitter whether the plurality of data frames transmitted from the transmitter have been received in a single response. FIG. 2 illustrates a data frame structure for the latter method.

FIG. 2 illustrates an example of a structure of a "delayed ACK" frame conforming to the IEEE 802.15.3 standard.

When a certain request is received from a transmitter, a receiver transmits a delayed ACK frame shown in FIG. 2 to the transmitter.

The delayed ACK frame includes a MAC header field of 10 bytes and a MAC frame body field. The MAC frame body field includes a MAC frame payload field having a variable size and a 4-byte FCS field used to determine existence or non-existence of an error in the MAC frame payload field.

The MAC frame payload field includes a plurality of MPDU ID block fields, which indicate identification information regarding MAC protocol data frames that the receiver has received from the transmitter without an error. For example, when only 15 data frames have been correctly received by the receiver among 20 data frames transmitted from the transmitter, identification information regarding the 15 data frames is recorded in 15 MPDU ID block fields, and the delayed ACK frame is transmitted to the transmitter. Accordingly, the size of the delayed ACK frame is variable.

As shown in FIG. 1C, when the transmitter does not receive an ACK-response frame for a transmitted data frame, the transmitter retransmits the data frame after unconditionally waiting for a predetermined period of time. In particular, since a channel is allocated even during a waiting time, the conventional technology is very inefficient in a network where a matter of resources related with channel allocation is essential.

Moreover, as shown in FIG. 2, since the receiver needs to transmit identification information regarding all of correctly received data frames, as the number of data frames increases, the size of a delayed ACK frame also increases.

SUMMARY OF THE INVENTION

The present invention provides a mechanism for efficiently retransmitting a data frame by defining a data frame format.

The present invention also provides a mechanism for adaptively transmitting a response frame from a receiver to a transmitter according to a reception rate, at which data frames transmitted from the transmitter are received by the receiver, by defining a response frame with respect to a plurality of data frames.

According to an exemplary embodiment of the present invention, there is provided a method retransmitting a data frame in a wireless network. In the method, a first network apparatus transmits a data frame requesting a response frame to a second network apparatus. The second network apparatus determines the reception mode of the data frame. The second network apparatus transmits a response frame to the first network apparatus. The response frame is of a first type or a second type based on the reception mode of the data frame. The first network apparatus retransmits the data frame according to a type of the response frame transmitted to the first network apparatus.

In one exemplary aspect, the reception mode comprises a first reception mode indicating that the data frame was received normally by the second network apparatus or a second reception mode indicating that the data frame was never received or was received abnormally by the second network apparatus.

In another exemplary aspect, the second network apparatus transmits a response frame of the first type, indicating that the data frame was received normally, when the data frame is of the first reception mode, and transmits a response frame of the second type, indicating that the data frame was never received or was received abnormally, when the data frame is of the second reception mode.

In another exemplary aspect, the first network apparatus retransmits the data frame to the second network apparatus when the response frame transmitted to the first network apparatus is of the second type. The first network apparatus does not retransmit the data frame when the response frame transmitted to the first network apparatus is of the first type.

In another exemplary aspect, the wireless network conforms to the IEEE 802.15.3 standard, the response frame has an "Imm-ACK" frame structure conforming to the IEEE 802.15.3 standard, and a response frame of the first type is distinguished from a response frame of the second type using a value of a frame type field comprised in the Imm-ACK frame.

According to a second exemplary embodiment of the present invention, there is provided a method of retransmitting a data frame in a wireless network. In the method, a first network apparatus transmits a plurality of data frames to a second network apparatus. The first network apparatus then transmits a request frame requesting a response frame to the second network apparatus. The second network apparatus determines a type reception of each of the plurality of data frames transmitted by the first network apparatus. The second network apparatus transmits a response frame to the first network apparatus. The response frame is of a first type or a second type based on the reception modes of the plurality of data frames. The first network apparatus, in response to the reception of the response frame, performs data frame retransmission according to the information contained in the response frame.

In an exemplary aspect, the reception mode may comprise a first reception mode indicating that the data frame was received normally or a second reception mode indicating that the data frame was never received or was received abnormally.

According to another exemplary aspect, the second network apparatus transmits a response frame of a first type, indicating the non-reception or the abnormal reception of those data frames of the second reception mode, when, of the plurality of data frames transmitted by the first network apparatus, the number of data frames of the first reception mode is greater than the number of data frames of the second reception mode. The second network apparatus transmits a response frame of the second type, indicating normal reception of those data frames of the first reception mode, when, of the plurality of data frames transmitted by the first network apparatus, the number of data frames of the second reception mode is greater than the number of data frames of the first reception mode.

According to another exemplary aspect, the first type of response frame comprises an ACKed field, indicating the number of data frames of the first mode, and for each of the data frames of the second mode, a corresponding ID field including identification information for the data frame. The second type of response frame comprises a NACKed field, indicating the number of data frames of the second mode, and for each of the data frames of the first mode, a corresponding ID field including identification information for the data frame.

According to another exemplary aspect, when the response frame is of the first type, the first network apparatus retransmits those data frames of the second reception mode corresponding to the identification information in the ID fields, and when the response frame is of the second type, the first network apparatus retransmits those data frames of the second reception mode corresponding to the information in the NACKed field.

According to yet another exemplary aspect, the wireless network conforms to the IEEE 802.15.3 standard, the response frame may have a "Delayed ACK" frame structure conforming to the IEEE 802.15.3 standard, and a response frame of the first type may be distinguished from a response frame of the second type using a value of a frame type field comprised in a MAC header in the Delayed ACK frame.

According to a third exemplary embodiment of the present invention, there is provided a network apparatus in a wireless network. The network apparatus comprises a frame transceiver, a frame error inspector, and a response frame generator. The frame transceiver receives a data frame, requesting a response frame, from a transmitter and transmits a response frame generated by the response frame generator. The frame error inspector determines whether there is an error in the data frame and that the data frame is of a first reception mode if there is no error in the data frame or determines that the data frame is of a second reception mode if there is an error in the data frame. The response frame generator generates a response frame. If the data frame is of the first reception mode, the response frame is of a first type, indicating the normal reception of the data frame, and if the data frames is of the second reception mode, the response frame is of a second type, indicating the non-reception or the abnormal reception of the data frame.

According to another exemplary embodiment, a network apparatus in a wireless network is provided, comprising a frame transceiver, which, when a data frame is not received or is abnormally received from an external apparatus, transmits a response frame to the external apparatus and then newly receives the data frame from the external apparatus. The response frame indicates the non-reception or the abnormal reception of the data frame.

According to an exemplary aspect of this embodiment, the wireless network conforms to the IEEE 802.15.3 standard, the response frame has an "1 mm-ACK" frame structure conforming to the IEEE 802.15.3 standard, and the response frame is identified using a value of a frame type field comprised in the Imm-ACK frame.

According to a further exemplary embodiment of the present invention, there is provided a network apparatus in a wireless network. The network apparatus comprises a frame transceiver which receives a plurality of data frames from an external apparatus, the transmits a response frame to the external apparatus and then newly receives at least one data frame. The response frame if of a first type or a second type based on a reception mode of the plurality of data frames.

The reception mode may comprise a first reception mode indicating that the data frame was received normally, or a second reception mode indicating that the data frame was never received or was received abnormally.

According to another exemplary aspect, the response frame of the first type indicates the non-reception or the abnormal reception of those data frames of the second reception mode, when, of the plurality of data frames received by the transceiver, the number of data frames of the first reception mode is greater than the number of data frames of the second reception mode. The response frame of the second type indicates the normal reception of those data frames of the first reception mode, when, of the plurality of data frames received by the transceiver, the number of data frames of the second reception mode is greater than the number of data frames of the first reception mode.

According to another exemplary aspect, the response frame of the first type comprises an ACKed field indicating the number of data frames of the first mode and, for each of the data frames of the second mode, a corresponding ID field including identification information for the data frame. The response frame of the second type comprises a NACKed field indicating the number of data frames of the second mode, and for each of the data frames of the first mode, a corresponding ID field including information for the data frame. Then, when the response frame is of the first type, the transceiver receives a retransmission of those data frames of the second reception mode corresponding to the identification information in the ID fields, and when the response frame is of the second type, the transceiver receives a retransmission of those data frames of the second reception mode corresponding to the information in the NACKed field.

According to another exemplary aspect of this embodiment, the wireless network conforms to the IEEE 802.15.3 standard, the response frame has a "Delayed ACK" frame structure conforming to the IEEE 802.15.3 standard, and the first response frame is distinguished from the second response frame using a value of a frame type field comprised in the MAC header in the Delayed ACK frame.

BRIEF DESCRIPTION OF THE DRAWINGS

The above and other features and advantages of the present invention will become more apparent by describing in detail exemplary embodiments thereof with reference to the attached drawings in which:

FIG. 4 illustrates a structure of a NACK-response frame according to an exemplary aspect of the present invention;

FIG. 5A is a logical block diagram of a receiver for transmitting a response frame according to an exemplary aspect of the present invention;

DETAILED DESCRIPTION OF THE INVENTION

Figure 1A:
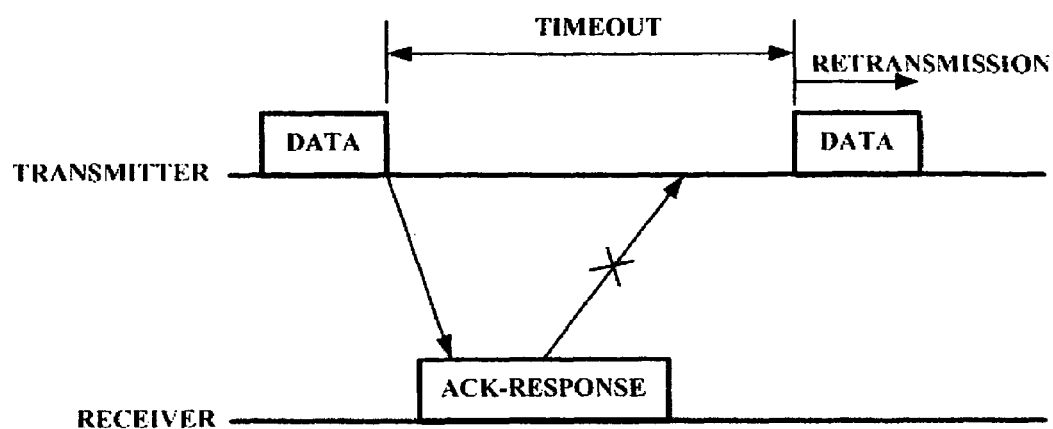
FIG. 1A illustrates a case where a transmitter retransmits a data frame to a receiver according to conventional technology when an ACK-response frame transmitted from the receiver is lost.
Figure 1B:
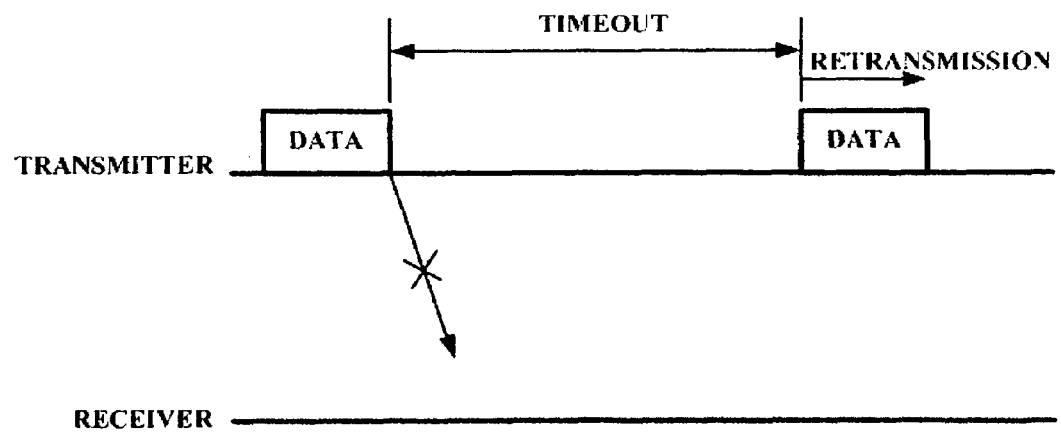
FIG. 1B illustrates a case where a transmitter retransmits a data frame to a receiver according to the conventional technology when the data frame transmitted from the transmitter is lost.
Figure 1C:
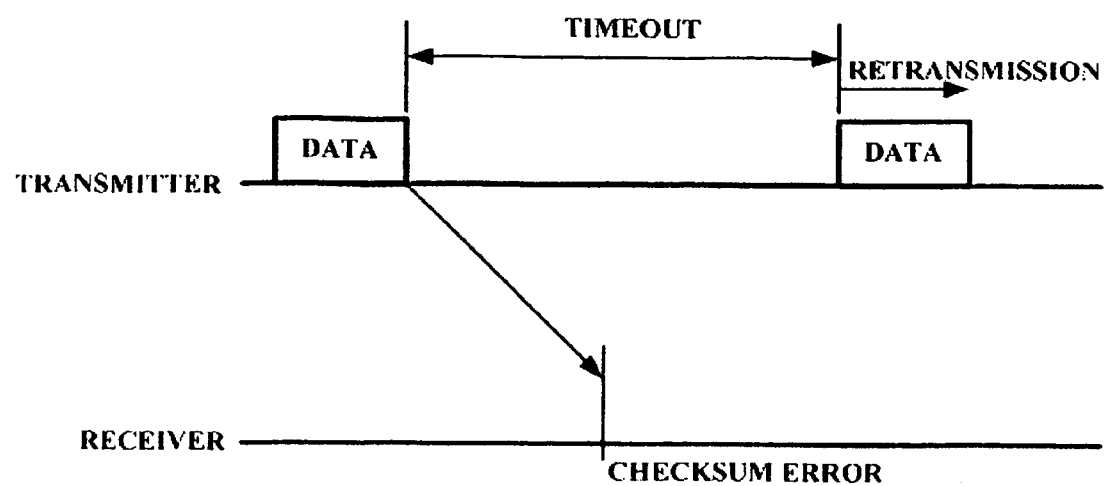
FIG. 1C illustrates a case where a transmitter retransmits a data frame to a receiver according to the conventional technology when a checksum error occurs with respect to the data frame transmitted from the transmitter.

The advantages and features of the present invention and methods for accomplishing the same will now be described more fully with reference to the accompanying drawings, in which exemplary aspects and embodiments of the invention are shown. This invention may, however, be embodied in many different forms and should not be construed as being limited to the exemplary aspects and embodiments set forth herein. Throughout the specification, the same reference numerals in different drawings represent the same element.

An exemplary embodiment of the present invention will now be described. For clarity of the description, it is assumed that a communication protocol conforms to IEEE 802.15.3.

Figure 3:
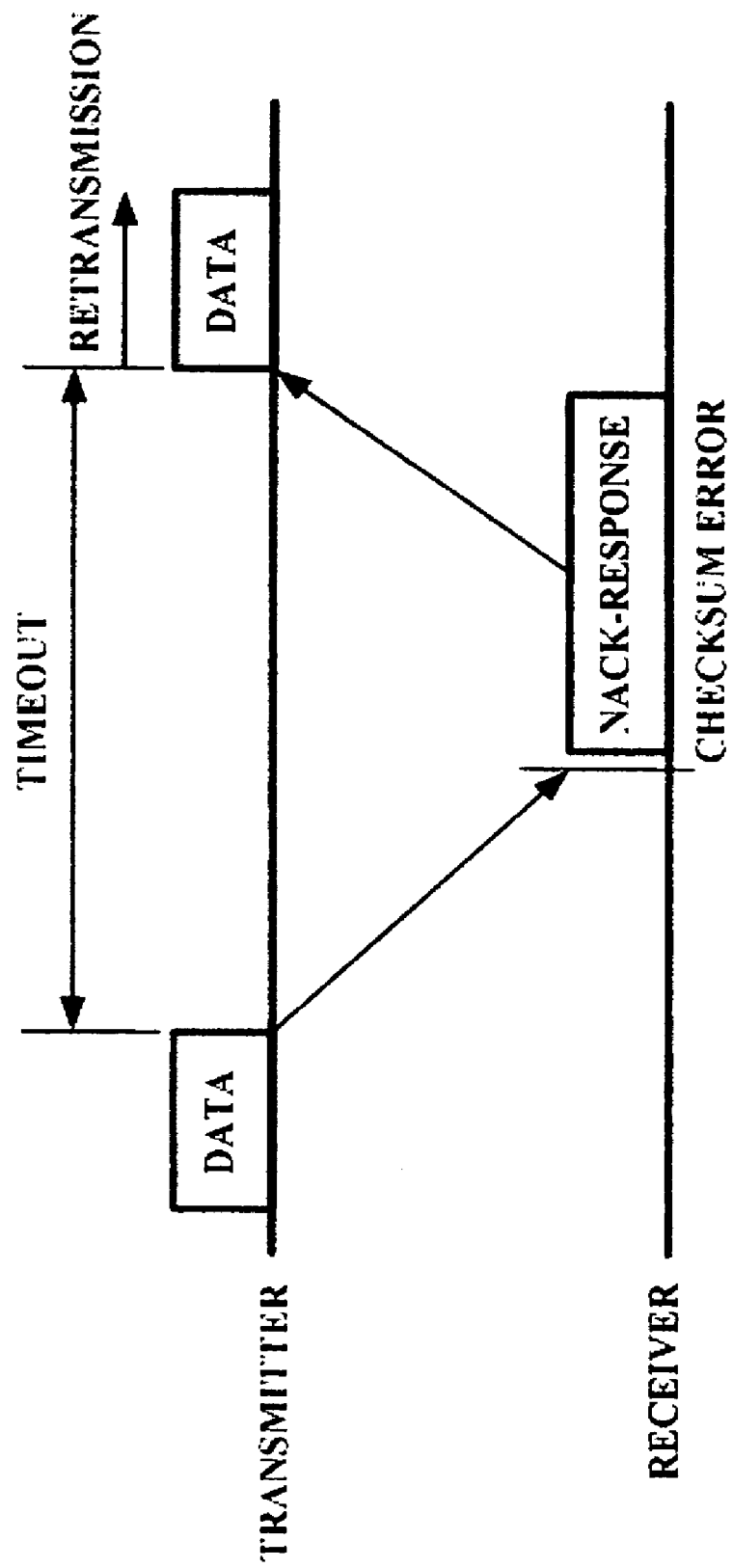
FIG. 3 illustrates an example in which a transmitter retransmits a data frame when a checksum error occurs in the data frame transmitted from the transmitter to a receiver, according to an exemplary aspect of the present invention.

FIG. 3 illustrates an example in which a transmitter retransmits a data frame when a checksum error occurs in the data frame transmitted from the transmitter to a receiver, according to an exemplary embodiment of the present invention.

Referring to FIG. 3, for example, when an error is detected in a frame payload as a result of checking a Frame Check Sequence (FCS) in the receiver, the receiver transmits a NACK-response frame to the transmitter to immediately request retransmission of a data frame. Accordingly, even during a predetermined waiting time, upon receiving the NACK-response frame from then receiver, the transmitter retransmits the previously transmitted data frame. FIG. 4 illustrates a structure of the NACK-response frame. Although the NACK-response frame shown in FIG. 4 has the same structure as an ACK-response frame defined in IEEE 802.15.3, the NACK-response frame can be distinguished from the ACK-response frame using a frame type field included in a frame control field. In other words, the frame type field contains information indicating a type of a current frame and can be expressed using 3 bits. Since bits 101 through 111 are reserved at present, the NACK-response frame can be identified by expressing the frame type field using reserved bits. The frame format conforming to IEEE 802.15.3 has been described. Generally, however, since a header of a data frame contains information indicating a type of frame or has reserved bits, the NACK-response frame can be defined using the information or the reserved bits.

Figure 5B:
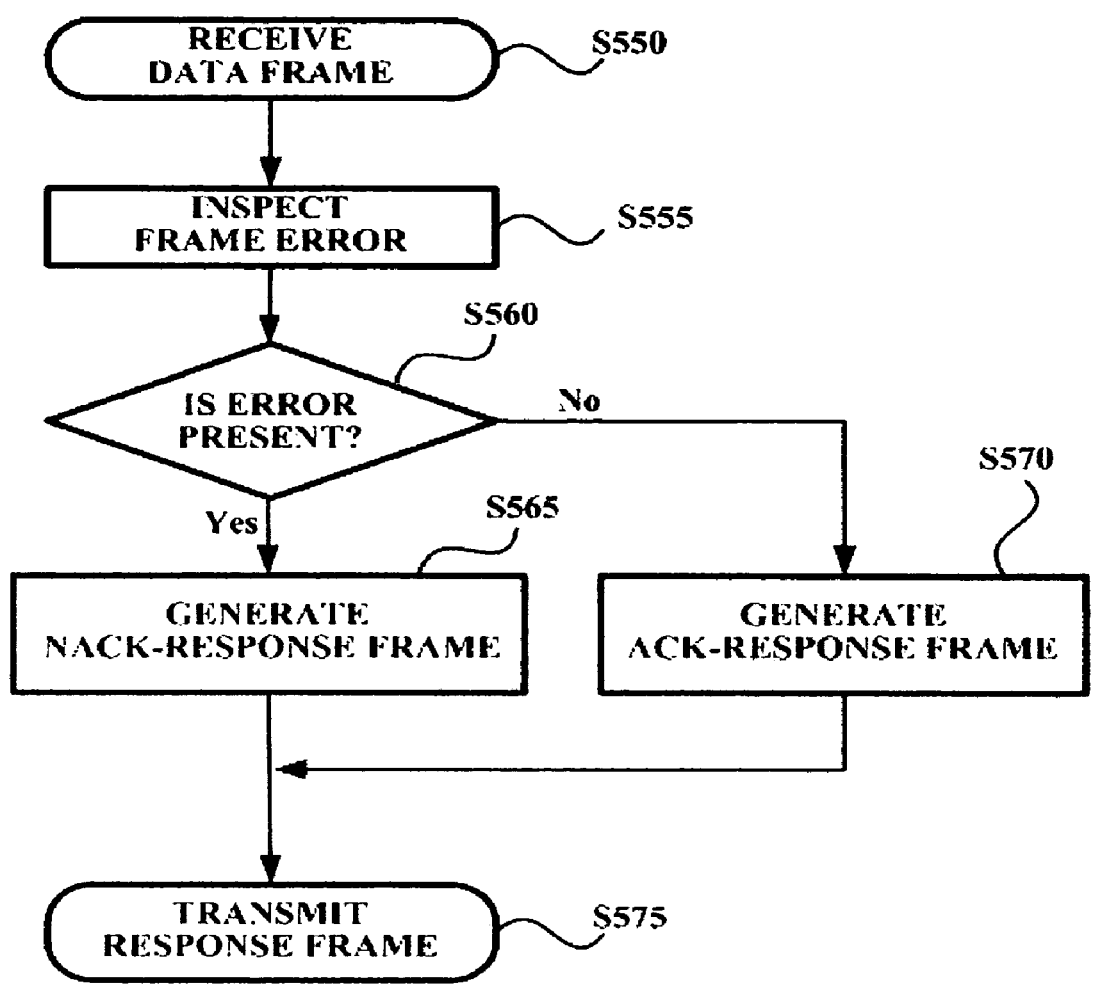
FIG. 5B is a flowchart of a method of transmitting a response frame according to an exemplary aspect of the present invention.

FIG. 5A is a logical block diagram of a receiver for transmitting a response frame according to an exemplary embodiment of the present invention. FIG. 5B is a flowchart of a method of transmitting a response frame according to an exemplary embodiment of the present invention. The method shown in FIG. 5B can be implemented using the receiver shown in FIG. 5A.

FIG. 5A illustrates a logical block diagram of a response frame processing unit 500 which operates in a receiver's network apparatus receiving a data frame from a particular transmitter (not shown) through a network 540. For clarity of the description, it is assumed that the data frame is a frame requesting a response message.

The response frame processing unit 500 includes a frame transceiver 510, a frame error inspector 520, and a response frame generator 530. These elements of the response frame processing unit 500 can be implemented by software modules.

When the frame transceiver 510 receives a data frame in step S550, the frame error inspector 520 examines whether an error is present in the received data frame using a method such as a checksum check to examine whether there is an error in the bits constituting a frame in step S555. The response frame generator 530 generates a response frame according to an examination result. In other words, when an error is present in the data frame in step S560, the response frame generator 530 generates a NACK-response frame in step S565. When an error is not present in step S560, the response frame generator 530 generates an ACK-response frame in step S570. Structures of the NACK- and ACK-response frames conform to a current protocol. The response frame generated by the response frame generator 530 is transmitted to a transceiver's network apparatus by the frame transceiver 510 in step S575.

When a single NACK-response frame is used, a difference between a retransmission timeout period $T_{ret}$ and a time $T_{NACK}$ from the transmitter's transmission of a data frame to the transmitter's reception of the NACK-response frame can be reduced when the transmitter transmits data frames. Accordingly, when N NACK-response frames are used, a period of time that can be reduced for transmission of data frames is expressed by Equation (1).

$$T_{save} = N_{NACK\text{-}response} * (T_{ret} - T_{NACK}) \qquad (1).$$

Here, $N_{NACK\text{-}response}$ indicates a number of NACK-response frames sent.

Figure 2:
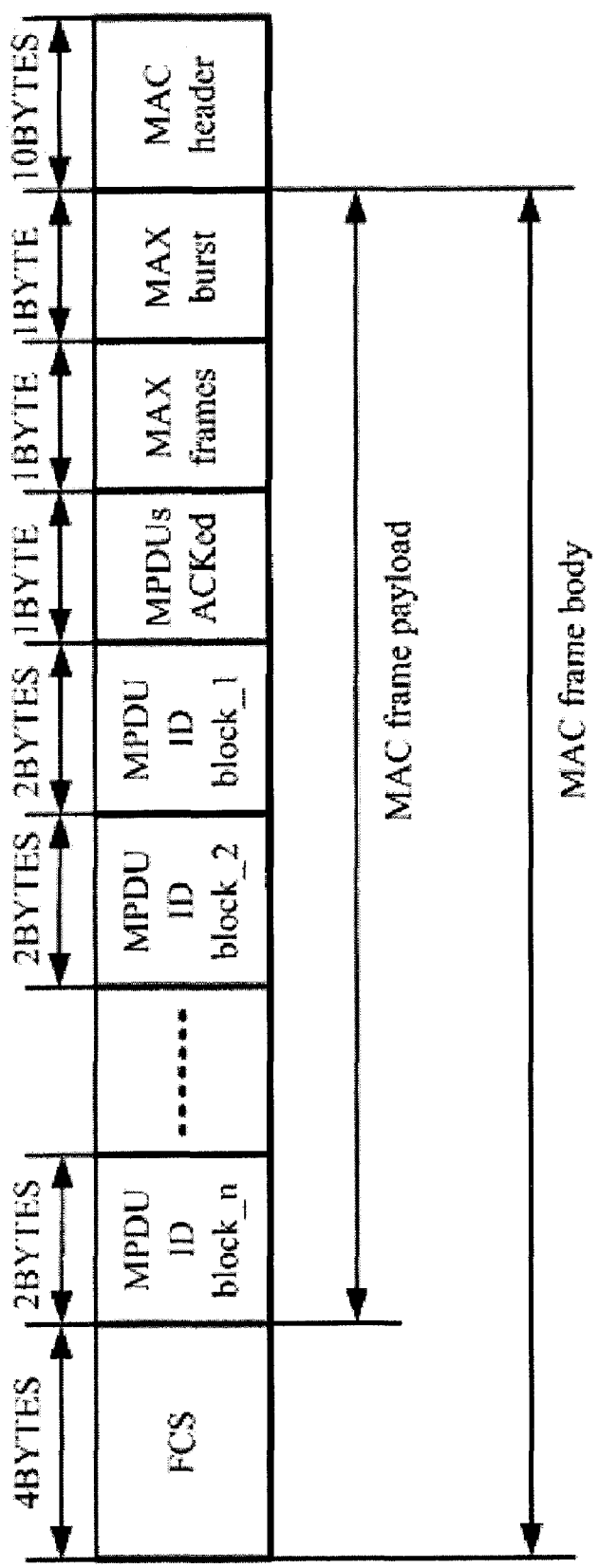
FIG. 2 illustrates an example of a structure of a "delayed ACK" frame conforming to the IEEE 802.15.3 protocol.
Figure 6:
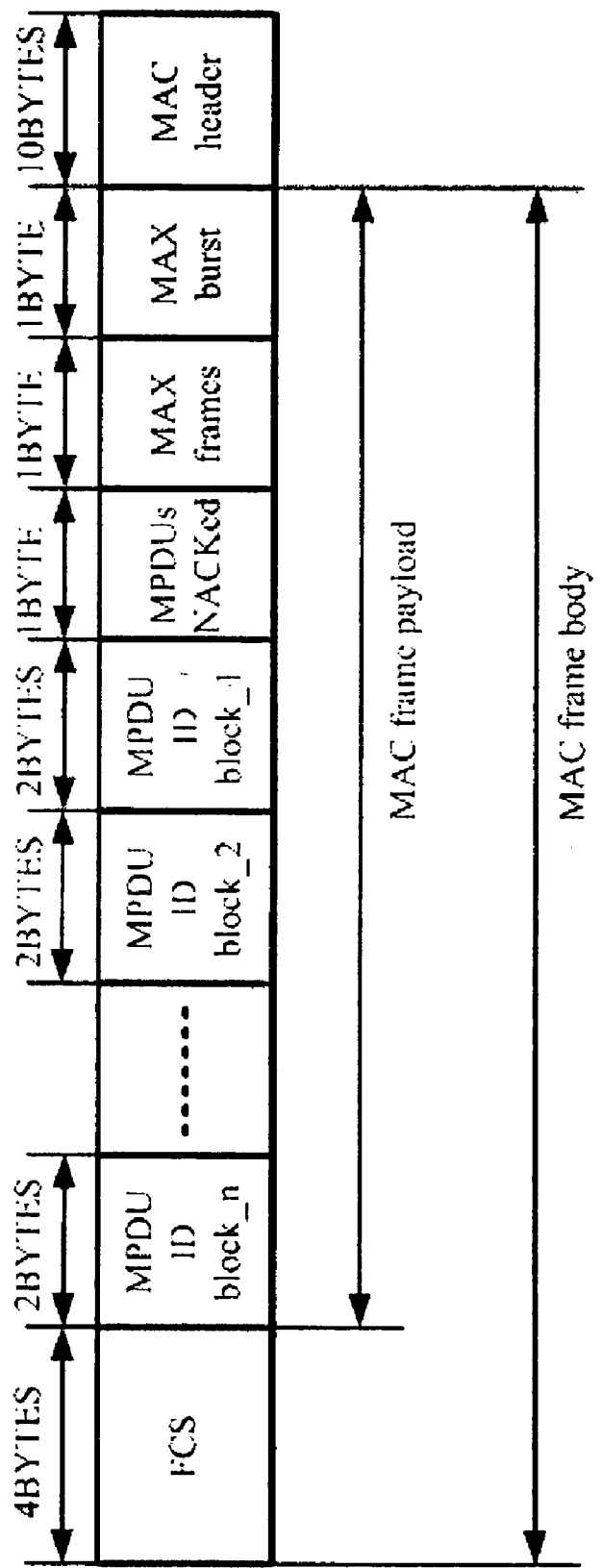
FIG. 6 illustrates a structure of a delayed NACK frame according to an exemplary aspect of the present invention.

Alternatively, instead of transmitting a response frame for each data frame received from the transmitter, the receiver may transmit a response message for a plurality of data frames if requested to do so by the transmitter. For this operation, when a delayed ACK frame conforming to the IEEE 802.15.3 standard is used, identification information of all data frames received correctly is transmitted to the transmitter over a Medium Access Control (MAC) frame payload. However, in an embodiment of the present invention, a delayed NACK frame having the same fundamental frame structure as the delayed ACK frame is defined. Here, the name of this newly defined frame is not restricted to the "delayed NACK." Any type of response frame including identification information regarding a plurality of data frames received incorrectly can be defined as a delayed NACK frame. For clarity of the description, the newly defined frame according to the present invention is referred to as the delayed NACK frame to correspond to the delayed ACK frame. The delayed NACK frame can be distinguished from the delayed ACK frame shown in FIG. 2 based on the frame type field included in the MAC header shown in FIG. 4. FIG. 6 illustrates a structure of a MAC frame payload field included in the delayed NACK frame according to an exemplary embodiment of the present invention. An MPDUs NACKed field indicates the number of data frames that the receiver has incorrectly received from the transmitter. An MPDU ID block field indicates identification information regarding a data frame that the receiver has incorrectly received from the transmitter.

The delayed NACK frame may be used when many ACK-response frames are required for data frames transmitted from the transmitter to the receiver. For example, let's assume that the receiver correctly receives all of 20 data frames that have been transmitted from the transmitter and the transmitter requests the delayed ACK frame for the 20 data frames. In this case, when the delayed ACK frame is used, 20 MPDU ID block fields need to be embedded in the MAC frame payload. However, when the delayed NACK frame is used, the same effect as using the delayed ACK frame can be achieve by embedding no MPDU ID block fields in the MAC frame payload. Generally, as the size of a data frame decreases, the transmission success ratio increases, and the transmission rate also increases.

As described above, when all of the 20 data frames that have been transmitted from the transmitter are correctly received by the receiver, the delayed ACK frame has a bigger size than the delayed NACK frame by 20×2 bytes=40 bytes.

Conversely, when many data frames are received incorrectly, it is effective to use the delayed ACK frame.

When the number of ACK-responses is greater than the number of NACK-responses with respect to a plurality of data frames, the number of bytes that can be saved by using the delayed NACK frame can be expressed by Equation (2).

$$S_{save} = (N_{ACK} - N_{NACK}) \times 2 \text{ bytes} \qquad (2),$$

where $N_{ACK}$ indicates the number of ACK-responses, and, $N_{NACK}$ indicates the number of NACK-responses.

Conversely, when NACK-responses are more than ACK-responses, a size that can be saved by using the delayed ACK frame can be expressed by Equation (3).

$$S_{save} = (N_{NACK} - N_{ACK}) \times 2 \text{ bytes} \qquad (3).$$

Although exemplary aspects and embodiments of the present invention has been shown and described, it will be appreciated by those skilled in the art that changes or modifications may be made without departing from the spirit and scope of the invention. Therefore, the aforementioned aspects and embodiments are merely illustrative in every respect and should not be considered restrictive in any way.

According to the present invention, a transmitter immediately retransmits a data frame upon receiving a NACK-response without waiting for a predetermined period of time, thereby reducing data frame transmission time. As a result, dissipation of resources can be prevented. In addition, a response frame, which includes identification information regarding a plurality of data frames received normally, and a response frame, which includes identification information regarding a plurality of data frames received incorrectly or never received, are adaptively selected, thereby decreasing a size of the response frame.

What is claimed is:

1. A method of retransmitting a data frame in a wireless network, comprising:
   a first network apparatus transmitting a data frame requesting a response frame to a second network apparatus;
   the second network apparatus determining a reception mode of the data frame
   the second network apparatus transmitting a response frame to the first network apparatus, wherein the response frame is of a first type or a second type based on the reception mode of the data frame; and
   the first network apparatus retransmitting the data frame according to a type of the response frame transmitted to the first network apparatus;
   wherein:

the wireless network conforms to the IEEE 802.15.3 standard;

the response frame has an "Imm-ACK" frame structure conforming to the IEEE 802.15.3 standard; and a response frame of the first type is distinguished from a response frame of the second type using a value of a frame type field comprised in the Imm-ACK frame.

2. The method of claim 1, wherein the reception mode is one of a first reception mode indicating that the data frame was received normally by the second network apparatus, and a second reception mode indicating that the data frame was never received or was received abnormally by the second network apparatus.

3. The method of claim 2, wherein the second network apparatus transmits a response frame of the first type, indicating that the data frame was received normally, when the data frame is of the first reception mode, and the second network apparatus transmits a response frame of the second type, indicating the data frame was never received or was received abnormally, a when the data frame is of the second reception mode.

4. The method of claim 3, wherein:

the first network apparatus retransmits the data frame to the second network apparatus when the response frame transmitted to the first network apparatus is of the second type.

5. The method of claim 4, wherein:

the first network apparatus does not retransmit the data frame to the second network apparatus when the response frame transmitted to the first network apparatus is of the first type.

6. A method of retransmitting a data frame in a wireless network, comprising:

a first network apparatus transmitting a plurality of data frames to a second network apparatus;

the first network apparatus transmitting a request frame requesting a response frame to the second network apparatus;

the second network apparatus determining a reception mode of each of the plurality of data frames transmitted by the first network apparatus;

the second network apparatus transmitting a response frame to the first network apparatus, wherein the response frame is of a first type or a second type based on the reception modes of the plurality of data frames; and the first network apparatus, in response to the reception of the response frame, performing data frame retransmission according to the information contained in the response frame;

wherein the reception mode comprises:

a first reception mode indicating that the data frame was received normally, or a second reception mode indicating that the data frame was never received or was received abnormally;

wherein the second network apparatus transmits a response frame of the first type, indicating the non-reception or the abnormal reception of those data frames of the second reception mode when, of the plurality of data frames transmitted by the first network apparatus, the number of data frames of the first reception mode is greater than the number of data frames of the second reception mode; and wherein the second network apparatus transmits a response frame of the second type, indicating normal reception of those data frames of the first reception mode when, of the plurality of data frames transmitted by the first network apparatus, the number of data frames of the second reception mode is greater than the number of data frames of the first reception mode.

7. The method of claim 6, wherein:

the response frame of the first type comprises:

an ACKed field indicating the number of data frames of the first mode, and for each of the data frames of the second mode, a corresponding ID field including identification information for the data frame; and the response frame of the second type comprises:

a NACKed field indicating the number of data frames of the second mode, and for each of the data frames of the first mode, a corresponding ID field including identification information for the data frame.

8. The method of claim 7, wherein:

when the response frame is of the first type, the first network apparatus retransmits those data frames of the second reception mode corresponding to the identification information in the ID fields; and when the response frame is of the second type, the first network apparatus retransmits those data frames of the second reception mode corresponding to the information in the NACKed field.

9. The method of claim 8, wherein:

the wireless network conforms to the IEEE 802.15.3 standard;

the response frame has a "Delayed ACK" frame structure conforming to the IEEE 802.15.3 standard; and a response frame of the first type is distinguished from a response frame of the second type using a value of a frame type field comprised in a MAC header in the Delayed ACK frame.

10. A network apparatus in a wireless network, comprising:

a frame transceiver configured such that, when a data frame is not received or is abnormally received from an external apparatus, the frame transceiver transmits a response frame indicating the non-reception or the abnormal reception of the data frame to the external apparatus and then newly receives the data frame from the external apparatus;

wherein:

the wireless network conforms to the IEEE 802.15.3 standard, the response frame has an "Imm-ACK" frame structure conforming to the IEEE 802.15.3 standard and the response frame is of a type identified using a value of a frame type field comprised in the Imm-ACK frame.

11. A network apparatus in a wireless network, comprising:

a frame transceiver configured to receive a plurality of data frames from an external apparatus, transmit a response frame to the external apparatus, and then newly receive at least one data frame, wherein the response frame is of a first type or a second type based on a reception mode of the plurality of data frames;

wherein the reception mode is one of:

a first reception mode indicating that the data frames were received normally, and a second reception mode indicating that a data frame was never received or was received abnormally;

wherein the transceiver transmits a response frame of a first type, indicating the non-reception or the abnormal reception of those data frames of the second reception mode, when, of the plurality of data frames received by the transceiver, the number of data frames of the first reception mode is greater than the number of data frames of the second reception mode; and wherein the transceiver transmits a response frame of a second type, indicating the normal reception of those data frames of the first reception mode, when, of the plurality of data frames received by the transceiver, the number of data frames of the second reception mode is greater than the number of data frames of the first reception mode.

12. The apparatus of claim 11, wherein:

the response frame of the first type comprises:

an ACKed field indicating the number of data frames of the first mode, and for each of the data frames of the second mode, a corresponding ID field including identification information for the data frame; and the response frame of the second type comprises:

a NACKed field indicating the number of data frames of the second mode, and for each of the data frames of the first mode, a corresponding ID field including identification information for the data frame.

13. The network apparatus of claim 12, wherein when the response frame is of the first type, the transceiver receives a retransmission of those data frames of the second reception mode corresponding to the identification information in the ID fields; and when the response frame is of the second type, the transceiver receives a retransmission of those data frames of the second reception mode corresponding to the information in the NACKed field.

14. The network apparatus of claim 12, wherein:

the wireless network conforms to the IEEE 802.15.3 standard, the response frame has a "Delayed ACK" frame structure conforming to the IEEE 802.15.3 standard, and a response frame of the first type is distinguished from a response frame of the second type using a value of a frame type field comprised in a MAC header in the Delayed ACK frame.

* * * * *